United States Patent
Sale et al.

(10) Patent No.: US 8,732,681 B2
(45) Date of Patent: May 20, 2014

(54) STACK ANALYSIS FOR POST MORTEM ANALYSIS

(75) Inventors: Darian Robert Peter Sale, Toronto (CA); Brian Cruickshank, Oakville (CA)

(73) Assignee: Texas Instruments Incorporated, Dallas, TX (US)

( * ) Notice: Subject to any disclaimer, the term of this patent is extended or adjusted under 35 U.S.C. 154(b) by 70 days.

(21) Appl. No.: 13/441,638

(22) Filed: Apr. 6, 2012

(65) Prior Publication Data

US 2012/0297370 A1 Nov. 22, 2012

Related U.S. Application Data

(60) Provisional application No. 61/486,389, filed on May 16, 2011.

(51) Int. Cl.
*G06F 9/45* (2006.01)

(52) U.S. Cl.
USPC .............................. 717/140; 717/128; 717/143

(58) Field of Classification Search
None
See application file for complete search history.

(56) References Cited

U.S. PATENT DOCUMENTS 5,590,329 A * 12/1996 Goodnow et al. ............. 717/144

* cited by examiner

*Primary Examiner* — Chuck Kendall
(74) *Attorney, Agent, or Firm* — Robert D. Marshall, Jr.; W. James Brady; Frederick J. Telecky, Jr.

(57) ABSTRACT

A debug tool that generates a call stack listing by analyzing the crash memory dump data without relying on register data values. The tool uses information gathered by the compiler and linker when the program was compiled and linked, including the stack's size and location in memory. By examining the stack location in the crash memory dump image in conjunction with the debugging data generated by the compiler and the linker and any existing trace data, the last valid frame may be reconstructed indicating the location of the crash.

6 Claims, 2 Drawing Sheets

STACK ANALYSIS FOR POST MORTEM ANALYSIS

CLAIM OF PRIORITY

This application claims priority under 35 USC 119(e)(1) to U.S. Provisional Application No. 61/486,389 filed May 16, 2011.

TECHNICAL FIELD OF THE INVENTION

The technical field of this invention is embedded software debugging systems.

BACKGROUND OF THE INVENTION

When application software that is running on an embedded device crashes in a production environment, it can be very difficult to determine why the crash occurred. The crash may be hard or impossible to replicate in a debug environment. The typical strategy is to save as much information as possible on the current state of the system for later analysis.

Most debugging toolsets include features that can analyze this saved data. This typically includes building a call stack of the calls leading up to the crash. However, generating this listing depends on having accurate stack memory and register contents at the precise time that the crash occurred.

A stack-based processor architecture uses a section of memory called the stack to store temporary data. A register called the stack pointer, or SP, will point to the current location of that memory. Temporary data will therefore be stored at an offset of the SP. When another function is called, the SP is adjusted to the top of the stack (or bottom if the stack grows down) so that the called function doesn't overwrite data that the current function still intends to use. The section of the stack used by one specific function is referred to as the frame. The size of a frame can grow and shrink during the execution of a function depending on its storage requirements at each point in time.

When a function is called, the location to return to, the return value, and other parameters are passed to it. This is done either by placing that data in specific registers, or by placing it onto the stack. Since registers that the called function intends to use will be copied to the stack before they are used so that their values can be restored before returning, these values will often be located on the stack at some point.

The compiler knows how a function intends to use the stack allowing it to generate DWARF (Debugging With Attributed Record Formats) debug information that describes for each point in a function, where the return PC is located, what registers have been pushed onto the stack, and how the SP has been adjusted since the start of the function.

The current method of generating a call stack listing is to first read the program counter (PC) register. The function that corresponds to where the return PC is located and what the return SP is can then all be looked up in the DWARF information using the PC value as a key. The value of the return PC indicates the calling function. The process can then be repeated for that function. This ends up showing a list of all calling functions leading up to the current function.

Generating this listing depends on having accurate stack memory and registers available at the precise time that the crash occurred. If register information is incomplete or inaccurate, the debugger will not know where on the stack to start looking, or what function's frame description it should look up to find the previous frame.

Crashes are often caused by a branch taken on an invalid pointer, either due to a logic error or corrupted memory due to a heap overflow, an uninitialized variable, improperly configured (DMA) Direct Memory Access, or other problems. In the absence of Operating System (OS) or other system protections this type of error can lead to invalid opcodes being executed by the processor and corruption of the registers and perhaps the stack, which can make it impossible for debugging toolsets to rebuild the call stack using standard approaches. This, in turn, makes it very difficult to determine the chain of events that led up to the crash.

SUMMARY OF THE INVENTION

A debugging tool is created that generates a call stack listing using a systematic automated analytic process to analyze the crash dump memory data without having to rely on unreliable (or unavailable) register data values.

The analysis process uses information generated by the compiler and linker when the program was built, including the address of the start of the application's stack and the maximum expected size of the stack (based on how much memory was allocated for it by the linker). This information defines where in memory the stack would reside. The tool then searches this stack memory region in the crash dump memory image data, for any values that map to an address within a function. Those values may be, but aren't guaranteed to be, return values to the calling function for that stack frame.

The debug info that was generated when the program was built will indicate where within a given function branches exist, and where they branch to (if that information is known at compile time). This lets the tool determine the current function for that call frame.

The debug info generated by the compiler and linker will indicate at what offset from the stack pointer the return address is located. Using this, a stack pointer and program counter that would unwind to the calling function can be determined. From that the rest of the call stack from that point on can be unwound using existing standard approaches.

Repeating the above on every possible return address found will lead to multiple possible call stack listing 'candidates'. These can be filtered against each other to remove shorter versions of the same listing, or listings with fewer frames that are within another longer listing.

On some devices, such as the TMS320TC16498 device from Texas Instruments, trace data can be automatically logged by the device as it runs to a dedicated 'emulation trace buffer'. This trace data can be either moved by DMA into main memory while the device is running (so that it can be included in the crash dump memory image) or can be captured to a file after the crash condition has been detected. The tool can use this trace data to further enhance and filter the stack listings. Trace data will show the tail end of the execution path taken, and thus could indicate the last few frames accurately. This could give a precise value for the program counter within the top of the stack, or indicate which frame was the frame where the exception occurred, or could indicate what the top frame is if the branch is determined at runtime instead of compile time.

The call stack candidates generated by the tool represent all of the possible scenarios leading up to the crash that have an end-state consistent with the crash dump memory image. When functions return, their return value remains on the stack until overwritten by other operations, so earlier calls that returned prior to the crash will appear as partial call stacks. Or, due to stack corruption, the middle of the stack may be corrupted and thus a call stack at the beginning and end only would appear. This data can be used to isolate what calls were being performed when the crash occurred, and thus isolate where the problem lies. If trace data is available, the tool can indicate all of the stack data that has been correlated with the trace data and the location where execution flow stopped processing valid software program addresses.

BRIEF DESCRIPTION OF THE DRAWINGS

These and other aspects of this invention are illustrated in the drawings, in which.

DETAILED DESCRIPTION OF PREFERRED EMBODIMENTS

The analysis process uses information generated by the compiler and linker when the program was built, including the address of the start of the application's stack and the max expected size of the stack (based on how much was allocated for it by the linker). This information defines where in memory the stack would reside. The tool then searches this stack memory region, in the crash dump memory image data, for any values that map to an address within a function. Those values may be, but aren't guaranteed to be, return values to the calling function for that stack frame.

The DWARF debug info that was generated when the program was built can be extended to indicate where within a given function branches exist, and where they branch to (if that is known is known at compile time). This lets the tool determine the function that was most likely called by the previously found calling function.

If the debug info does not contain branch information, or the branch location is not known at compile time, the called function can instead be determined by continuing to look along stack memory for the next value that appears to be a return address.

The debug information generated by the compiler and linker will indicate at what offset from the stack pointer the return address is located. Using this, a stack pointer and program counter that would unwind to the calling function can be determined. From that, the rest of the call stack from that point can be unwound using existing standard approaches.

Figure 1:
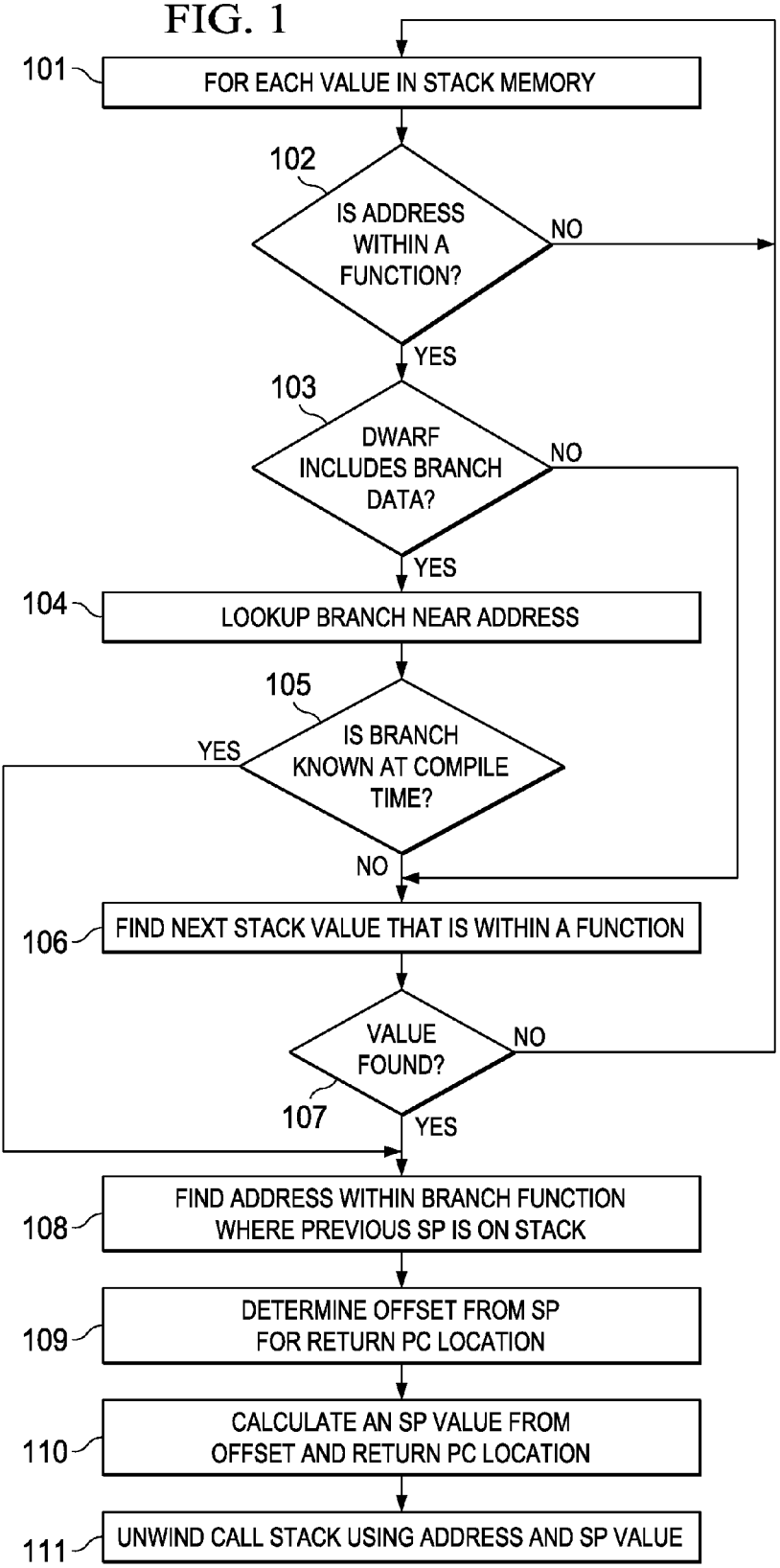
FIG. 1 illustrates a flow chart of the steps used to recreate debugging information.

FIG. 1 demonstrates the logic flow used in searching the stack memory. Starting at block 101 the first value is examined in block 102 to determine if the address is within a function. If it is not, the flow returns to block 101 to look at the next entry. If it is within a function, block 103 checks to see whether the DWARF database contains branch data for the function. If the branch data is available in DWARF, block 104 looks up the branch address, then block 105 determines whether the branch was known at compile time or not. If the branch was defined at compile time, block 108 finds the location of the previous stack pointer on the stack. Block 109 then determines the return program counter location by looking at the offset from the stack pointer, and block 110 determines the stack pointer from the return program counter location. Once this is done, block 111 has the information required to reconstruct the stack for the function, using the stack pointer address and value.

If block 103 finds that branch data is not available in the DWARF database, blocks 106 and 107 attempt to find the next stack value that is within a function. If a value is found flow continues to block 108. If no value found, flow returns to block 101 to repeat the process.

If in block 105 we find that the branch was not known at compile time flow continues to block 106.

Repeating this process for every possible return address that is found will lead to multiple possible call stack listing candidates. These candidates must be filtered against each other to remove shorter, incomplete versions of the same listings, or listings with fewer frames that are contained within another, longer listing.

On some devices, such as the TMS320TC16498 device from Texas Instruments, trace data can be automatically logged by the device as it runs to a dedicated 'emulation trace buffer'. This trace data can be either moved by DMA into main memory while the device is running (so that it can be included in the crash dump memory image) or can be captured to a file after the crash condition has been detected. The tool can use this trace data to further enhance and filter the stack listings. Trace data will show the tail end of the execution path taken, and thus could indicate the last few frames accurately. This could give a precise value for the program counter within the top of the stack, or indicate which frame was the frame where the exception occurred, or could indicate what the top frame is if the branch is determined at runtime instead of compile time.

Figure 2:
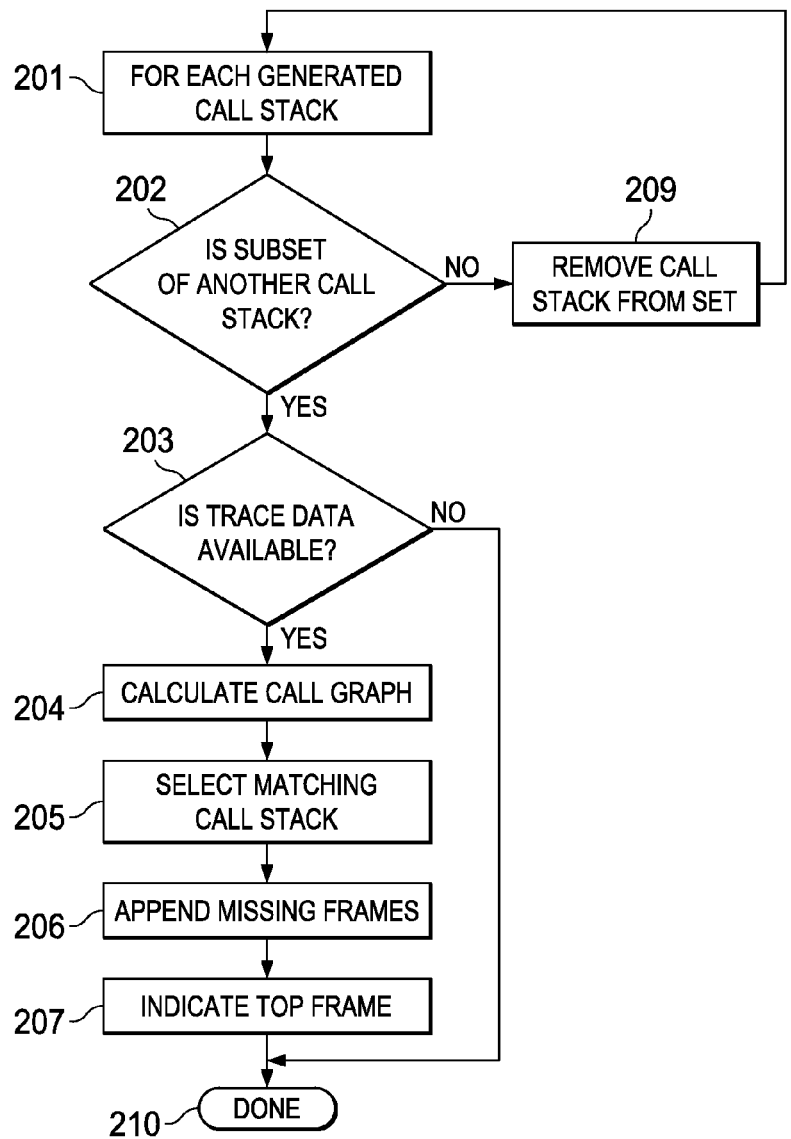
FIG. 2 further illustrates the steps used.

FIG. 2 shows the logic flow when trace data may be available. Starting at block 201 we look at each previously generated call stack candidate. In block 202 we determine whether the current candidate is a subset of another candidate or not. If it not, block 209 removes the candidate from the set, and returns to block 201. If yes, block 203 determines if trace data is available. If trace data is available blocks 204 and 205 select the matching call stack using the trace data. Block 206 then appends any missing frames, and block 207 determines the top frame. Block 210 indicates that the call stack has been reconstructed, and flow returns to block 201 until done. If in block 203 we find that trace data is not available the flow proceeds directly to block 210.

What is claimed is:

1. A method of operating a computer for debugging a software application comprising the steps of:
   compiling and linking the software application to run on the computer including
      specifying a plurality of functions, each function called to perform a corresponding data processing task and each function stored in memory at a corresponding range of addresses, and
      specifying a memory address of a start of a stack of the software application and a maximum expected stack size;
   running the compiled and linked software application on the computer;
   upon a crash of the compiled and linked software application running on the computer performing the following steps:
      searching memory locations from the memory address of the start of the stack to the maximum expected stack size for any address value that map to an address within one of the plurality of functions;
      determining the current function for the call frame from the debug information indicating the target of any branches;
      determining the value of the program counter and the stack pointer from the stack pointer offset value contained in the debug information;
      repeating the above for all possible address values found that map to an address within a function;

generating multiple stack call lists based on thus determined program counter and stack pointer values;
removing duplicate stack call lists;
removing shorter call lists that are within a longer call list;
selecting the last recovered stack call list indicating the location of the event causing the crash.

2. The method of claim 1, further comprising:
collecting trace data by the computer during running of the software application; and
upon the crash of the software application running on the computer further performing the step of searching trace data to locate the value of a program counter of the computer at the top of the stack.

3. The method of claim 1, further comprising:
collecting trace data by the computer during running of the software application; and
upon the crash of the software application running on the computer further performing the step of searching trace data to locate a frame where an execution exception has occurred.

4. The method of claim 1, further comprising:
collecting trace data by the computer during running of the software application; and
upon the crash of the software application running on the computer further performing the step of searching trace data to locate the top frame in case of a branch that was determined at run time instead of at compile time.

5. The method of claim 1, further comprising:
collecting trace data by the computer during running of the software application including moving the collected trace data to memory during running of the software application.

6. The method of claim 1, further comprising:
collecting trace data by the computer during running of the software application; and
upon the crash of the software application running on the computer further performing the step of capturing the collected trace data to a file.

* * * * *